United States Patent
Suetsugu (10) Patent No.: US 9,994,787 B2
(45) Date of Patent: Jun. 12, 2018

(54) METHOD FOR MANUFACTURING GREASE (71) Applicant: IDEMITSU KOSAN CO., LTD., Chiyoda-ku (JP)

(72) Inventor: Yoshiyuki Suetsugu, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days. days.

(21) Appl. No.: 14/910,114

(22) PCT Filed: Aug. 4, 2014

(86) PCT No.: PCT/JP2014/070489
§ 371 (c)(1),
(2) Date: Feb. 4, 2016

(87) PCT Pub. No.: WO2015/020001
PCT Pub. Date: Feb. 12, 2015

(65) Prior Publication Data
US 2016/0177214 A1    Jun. 23, 2016

(30) Foreign Application Priority Data
Aug. 6, 2013    (JP) ................................ 2013-163597

(51) Int. Cl.
*A01N 47/48*    (2006.01)
*C10M 137/10*    (2006.01)
(Continued)

(52) U.S. Cl.
CPC ....... *C10M 169/02* (2013.01); *B01F 7/00816* (2013.01); *B01J 19/1806* (2013.01);
(Continued)

(58) Field of Classification Search
CPC ................... C10M 2219/06; C10M 2207/125
(Continued)

(56) References Cited

U.S. PATENT DOCUMENTS 3,475,337 A * 10/1969 Witte, Jr. ................. C10M 5/00
508/539
5,523,009 A    6/1996 Root et al.
(Continued)

FOREIGN PATENT DOCUMENTS

CN    1272530 A    11/2000
CN    1408825 A    4/2003
(Continued)

OTHER PUBLICATIONS

International Search Report dated Oct. 14, 2014, in PCT/JP2014/070489 filed Aug. 4, 2014.
(Continued)

*Primary Examiner* — Vishal Vasisth
(74) *Attorney, Agent, or Firm* — Oblon, McClelland, Maier & Neustadt, L.L.P.

(57) ABSTRACT

A grease manufacturing method includes: mixing a first base oil containing a first thickener precursor and a second base oil containing a second thickener precursor to prepare a mixture; applying a shear rate of $10^2$ s$^{-1}$ or more to the mixture; and mixing and dispersing the first thickener precursor and the second thickener precursor for reaction to prepare a thickener.

17 Claims, 12 Drawing Sheets (51) Int. Cl.
  *C10M 169/02*  (2006.01)
  *C10M 115/08*  (2006.01)
  *C10M 105/04*  (2006.01)
  *B01J 19/18*  (2006.01)
  *B01F 7/00*  (2006.01)

(52) U.S. Cl.
  CPC ........ *C10M 105/04* (2013.01); *C10M 115/08* (2013.01); *B01J 2219/00779* (2013.01); *C10M 2205/0285* (2013.01); *C10M 2215/1026* (2013.01); *C10M 2217/0456* (2013.01); *C10N 2230/76* (2013.01); *C10N 2240/02* (2013.01); *C10N 2250/10* (2013.01); *C10N 2270/00* (2013.01)

(58) Field of Classification Search
  USPC .......................................................... 508/386
  See application file for complete search history.

(56) References Cited

U.S. PATENT DOCUMENTS

| | | | |
|---|---|---|---|
| 8,703,671 B2* | 4/2014 | Brossaud | C10M 169/06 422/224 |
| 2002/0039973 A1 | 4/2002 | Baum et al. | |
| 2006/0058203 A1 | 3/2006 | Laufer et al. | |
| 2010/0190668 A1* | 7/2010 | Hishinuma | C10M 169/02 508/182 |
| 2013/0157907 A1 | 6/2013 | Brossaud | |

FOREIGN PATENT DOCUMENTS

| | | |
|---|---|---|
| CN | 1781969 A | 6/2006 |
| CN | 101870906 A | 10/2010 |
| CN | 101962593 A | 2/2011 |
| CN | 102417854 A | 4/2012 |
| GB | 776548 A | 6/1957 |
| GB | 788 238 A | 12/1957 |
| JP | 02-004895 A | 1/1990 |
| JP | 03-190996 A | 8/1991 |
| JP | 11-021580 A | 1/1999 |
| JP | 11-503771 A | 3/1999 |
| JP | 2000-248290 A | 9/2000 |
| JP | 2003-253286 A | 9/2003 |
| JP | 2013-530289 A | 7/2013 |
| WO | 2010/017909 | 2/2010 |

OTHER PUBLICATIONS

Singapore Office Action dated Aug. 22, 2016 Patent Application No. 11201600510V.
Supplementary European Search Report dated Feb. 24, 2017 in connection with corresponding European Patent Application No. 1435283.4, filed Aug. 4, 2014.
Office Action dated Apr. 23, 2018, in Chinese Patent Application No. 201480042975.9 filed Aug. 4, 2014.

* cited by examiner

TOP VIEW

REACTOR INNER WALL

HIGH-SPEED ROTATING PORTION

LATERAL SIDE VIEW

HIGH-SPEED ROTATING PORTION

REACTOR (MANUFACTURING DEVICE)

↓ ROTARY SHAFT

FIG.3

TOP VIEW

REACTOR INNER WALL

HIGH-SPEED ROTATING PORTION

LATERAL SIDE VIEW

HIGH-SPEED ROTATING PORTION

REACTOR (MANUFACTURING DEVICE)

↓ ROTARY SHAFT

METHOD FOR MANUFACTURING GREASE

This application is a 371 of PCT/JP2014/070489, filed Aug. 4, 2014.

TECHNICAL FIELD

The present invention relates to a grease manufacturing method.

BACKGROUND ART

A typical manufacturing method of a urea grease includes: mixing a base oil with isocyanate to prepare a first solution kept at about 60 degrees C.; mixing a base oil with amine to prepare a second solution kept at about 60 degrees C.; adding the second solution to the first solution with stirring; heating the obtained mixture to about 160 degrees C.; and subsequently cooling the mixture to the room temperature. However, this method takes time for manufacturing (i.e., synthetic reaction) and is likely to generate micelle particles (so-called lumps) formed of a thickener. Large lumps are known for deteriorating an acoustic property when the grease is used in a slide device such as a bearing. Further, since the thickener having a non-uniform structure formed of large lumps less contributes to an inherent performance of the grease, an efficiency of the thickener is decreased. In other words, a lot of thickener is required for obtaining a predetermined hardness.

Accordingly, a grease manufacturing method for inhibiting formation of large lumps and improving an acoustic property has been proposed (see Patent Literatures 1 and 2). The manufacturing method disclosed in Patent Literature 1 includes: a method of feeding an amine solution (or an isocyanate solution) with liquid drops having a diameter of 300 μm or less into an isocyanate solution (or an amine solution) using a spray nozzle; and a method of spraying the above solutions to each other for reaction. This manufacturing method restricts a particle diameter of each of lumps formed of the thickener (a urea compound) to less than 100μm (about several tens μm). The manufacturing method disclosed in Patent Literature 2 includes a method of applying pressure to an amine solution and an isocyanate solution using a pressure device to increase the pressure to a predetermined pressure, and mixing the solutions by colliding with each other for reaction. This manufacturing method restricts a size of each of lumps to a range from about several hundreds um to several tens p.m.

CITATION LIST

Patent Literature(s)

Patent Literature 1: JP-A-2000-248290
Patent Literature 2: JP-A-3-190996

SUMMARY OF THE INVENTION

Problems to be Solved by the Invention

The manufacturing methods disclosed in Patent Literatures 1 and 2 raise concern about environment pollution and harmful effects caused by scattered amine and isocyanate and moreover are not necessarily sufficient for downsizing the lumps to fine particles.

An object of the invention is to provide a grease manufacturing method inhibiting generation of large micelle particles (large lumps) formed of a thickener.

Means For Solving the Problems

The inventor found that urea molecules and a bundle (fiber structure) were formed within an extremely short time after an isocyanate solution and an amine solution were mixed. The inventor estimated that a non-uniform structure such as a thick bundle and a large lump was formed because a low and/or non-uniform shear rate was applied to the obtained mixture in a typical manufacturing method. The inventor focused attention on this point and found that the lump could be made smaller than that formed in the typical manufacturing method by uniformly applying a high shear to the mixture of above two solutions immediately after being obtained.

Specifically, the invention provides the following grease manufacturing method.

(1) According to an aspect of the invention, a grease manufacturing method includes: mixing a first base oil containing a first thickener precursor and a second base oil containing a second thickener precursor to prepare a mixture; applying a shear rate of $10^2$ $s^{-1}$ or more to the mixture; and mixing and dispersing the first thickener precursor and the second thickener precursor for reaction to prepare a thickener.

(2) In the above arrangement, the shear rate is 107 s-1 or less.

(3) In the above arrangement, the shear rate is applied to the mixture within 15 minutes after mixing the first base oil and the second base oil.

(4) In the above arrangement, a ratio (Max/Min) of a maximum shear rate (Max) to a minimum shear rate (Min) in the shear rate applied to the mixture is 100 or less.

(5) In the above arrangement, the first thickener precursor is monoamine and the second thickener precursor is diisocyanate.

(6) In the above arrangement, the shear rate is applied to the mixture by introducing the mixture into a reactor configured to generate shearing by relative movement of facing wall surfaces.

(7) The grease manufacturing method in the above arrangement further includes: kneading the grease.

(8) The grease manufacturing method in the above arrangement further includes: heating the grease to a temperature in a range from 80 degrees C. to 200 degrees C.

(9) The grease manufacturing method in the above arrangement further includes: kneading the grease.

According to the invention, the grease manufacturing method inhibiting generation of large micelle particles (large lumps) formed of the thickener can be provided.

DESCRIPTION OF EMBODIMENT(S)

In a grease manufacturing method according to an exemplary embodiment of the invention (hereinafter also referred to as "the present manufacturing method"), a first base oil containing a first thickener precursor and a second base oil containing a second thickener precursor are mixed to prepare a mixture and a shear rate of $10^2$ s$^{-1}$ or more is applied to the mixture. In other words, within a short time after the first base oil and the second base oil are mixed, high-rate shearing is applied to the mixture. Subsequently, the first thickener precursor and the second thickener precursor are mixed and dispersed to react with each other, thereby preparing a thickener. The exemplary embodiment of the invention will be described below in detail.

Material for Manufacturing Grease

Base Oil

The first base oil and the second base oil used in the present manufacturing method are not particularly limited, but any mineral base oil and synthetic base oil used for typically manufacturing a grease are usable. The mineral base oil and synthetic base oil may be used singularly or in combination.

Usable mineral oils are obtained by purification in an appropriate combination of vacuum distillation, solvent deasphalting, solvent extraction, hydrocracking, solvent dewaxing, sulfate cleaning, clay purification, hydrorefining and the like. Examples of the synthetic base oil include polyalphaolefin (PAO) base oil, other hydrocarbon base oil, ester base oil, alkyldiphenylether base oil, polyalkylene glycol base oil (PAG), and alkylbenzene base oil. A kinematic viscosity at 40 degrees C. of each of the first base oil and the second base oil is preferably in a range from 10 mm$^2$/s to 600 mm$^2$/s.

Considering compatibility of the first base oil and the second base oil, the first base oil and the second base oil preferably have similar polar characteristics and similar viscosity characteristics. Accordingly, the first base oil and the second base oil are most preferably the same base oil in use.

Thickener

In the exemplary embodiment, a thickener is manufactured (synthesized) from two types of thickener precursors. The thickener precursors are not particularly limited. When the thickener is urea, the thickener precursors are monoamine and isocyanate (diisocyanate).

Examples of monoamine include: an aromatic monoamine such as aniline, p-toluidine, and naphthyl amine; an aliphatic monoamine such as hexyl amine, cyclohexyl amine, octyl amine, dodecyl amine, hexadecyl amine, and eicosyl amine.

A polyurea compound is obtainable by reacting, for instance, diisocyanate with monoamine or diamine. Examples of diisocyanate and monoamine used for forming the polyurea compound are the same as examples of diisocyanate and monoamine used for forming a diurea compound. Examples of diamine include ethylenediamine, propanediamine, butanediamine, hexandiamine, octanediamine, phenylenediamine, tolylenediamine, xylenediamine, and diaminodiphenylmethane.

Examples of isocyanate include diphenylmethane-4,4'-diisocyanate (MDI), tolylenediisocyanate, and naphthylene-1,5-diisocyanate. One of the above amines may be used alone or a plurality of amines may be mixed in use. Similarly, one of the above isocyanates may be used alone or a plurality of isocyanates may be mixed in use.

The above isocyanate and monoamine are continuously introduced at a molar ratio of 1:2 into a reactor (a grease manufacturing device) and are immediately subjected to high shearing as described later to be mixed and reacted with each other, so that a diurea grease having less large lumps can be manufactured. Moreover, the above isocyanate and a mixture of monoamine and diamine are continuously introduced at equivalent amounts of an isocyanate group and an amino group into a reactor (a grease manufacturing device) and are similarly subjected to high shearing as described later to be mixed and reacted with each other, so that a polyurea grease having less large lumps can be manufactured.

Manufacturing Method of Grease

In the present manufacturing method, the first base oil containing the first thickener precursor and the second base oil containing the second thickener precursor are mixed to prepare a mixture and a shear rate of $10^2$ s$^{-1}$ or more is applied to the mixture. In other words, in order to inhibit formation or growth of the lumps, it is crucial to apply high-rate shearing to the mixture within the shortest time as possible after the first base oil and the second base oil are mixed.

Specifically, a time elapsed before applying the above shear rate after mixing the first base oil and the second base oil is preferably within 15 minutes, more preferably within 5 minutes, further preferably within 10 seconds. Since a reaction starts after the precursors 1 and 2 are well mixed and dispersed, when the elapsed time is shorter, molecules of the thickener are less likely to form a thick bundle and a large lump.

The shear rate applied to the above mixture is $10^2$ s$^{-1}$ or more as described above, preferably $10^3$ s$^{-1}$ or more, more preferably $10^4$ s$^{-1}$ or more. A higher shear rate provides a more improved dispersion condition of the thickener precursors 1 and 2 and the generated thickener, thereby providing a more uniformed grease structure. In other words, the molecules of the thickener do not form a thick bundle and a large lump.

Considering safety of the device and heat generated by shearing and the like and removal of the heat, the shear rate applied to the above mixture is preferably $10^7$ s$^{-1}$ or less.

The above shear rate can be applied to the mixture, for instance, by introducing the mixture into a reactor configured to cause shearing by relative movement of facing wall surfaces. It should be noted that the shear rate represents the same as a later-described maximum shear rate.

Figure 1:
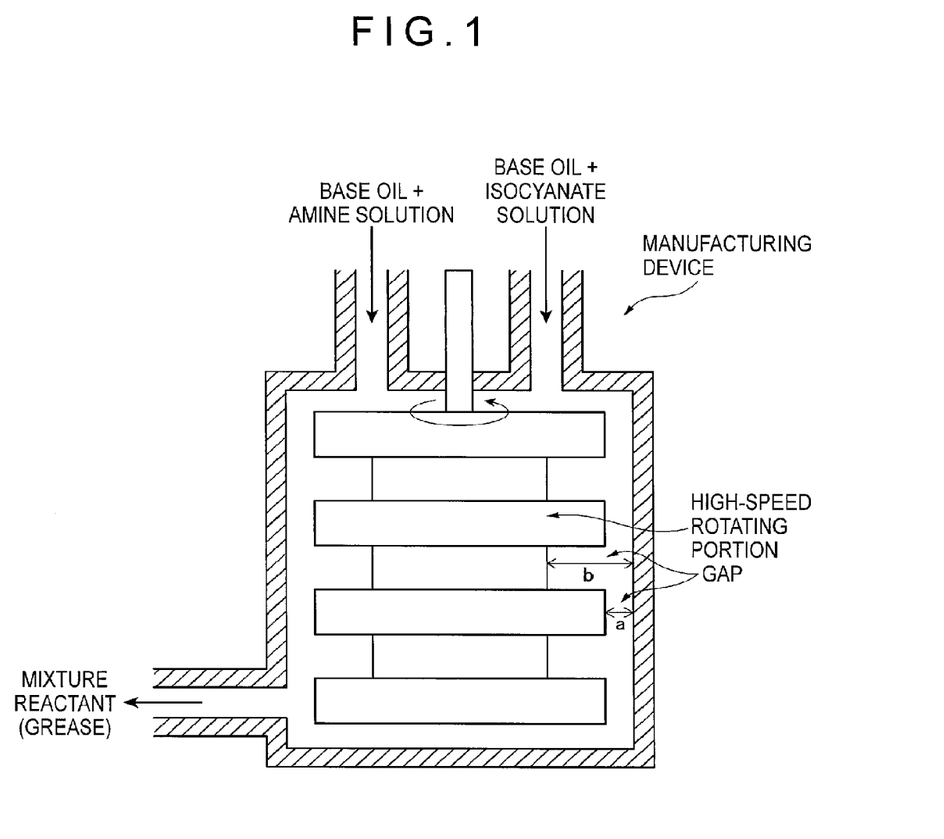
FIG. 1 is a schematic cross-sectional view showing an example of a manufacturing method (manufacturing device) of a urea grease in an exemplary embodiment of the invention.
Figure 2:
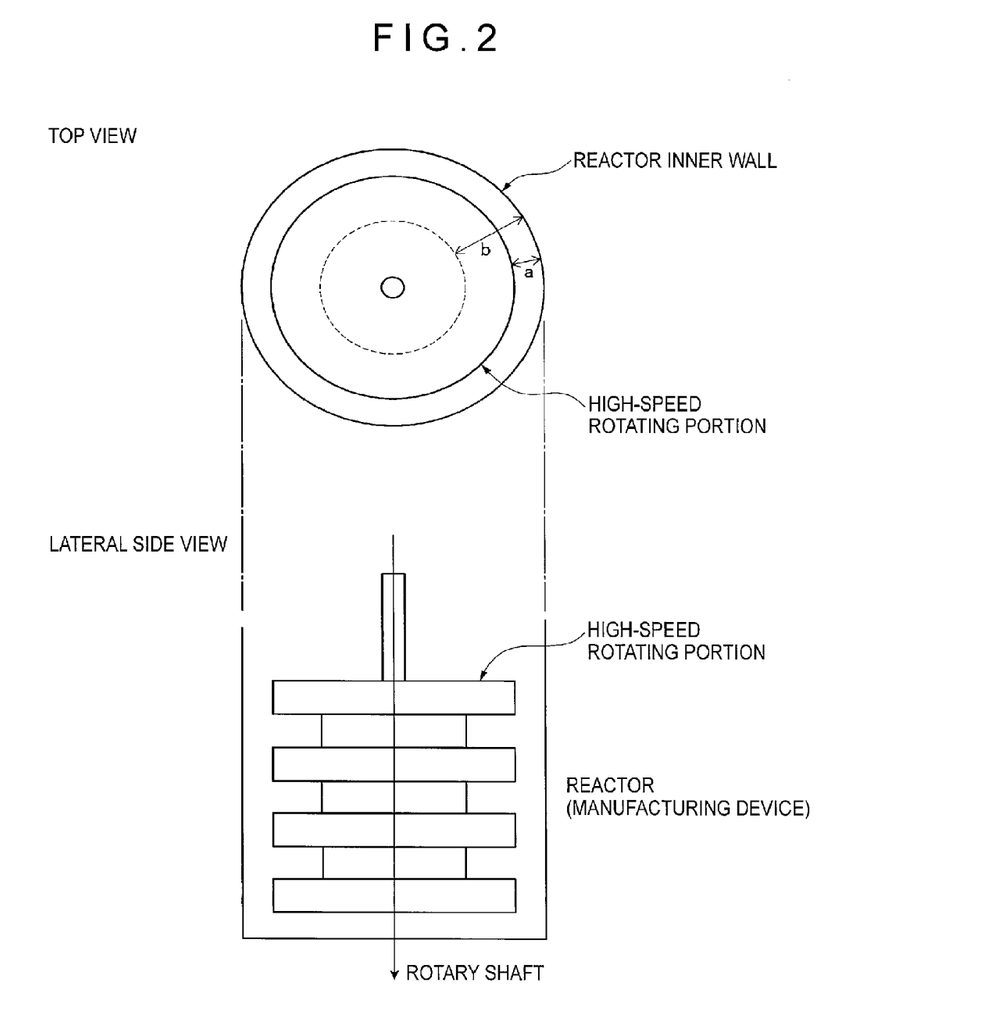
FIG. 2 schematically shows a lateral side and a top of the manufacturing device in FIG. 1.

A grease manufacturing device (the reactor) capable of generating such a high shear rate is exemplified by a manufacturing device structured as shown in FIG. 1. FIG. 2 schematically shows a lateral side and a top of the manufacturing device in FIG. 1.

The manufacturing device shown in FIG. 1 is configured to mix two types of base oils and uniformly apply high-rate shearing to the obtained mixture within an extremely short time. The high-rate shearing is applied to the mixture by a gap (a, b) between a high-speed rotating portion and an inner wall of the reactor. A diameter of the high-speed rotating portion may be constant (a=b) in a direction of a rotary shaft, or alternatively, the gap may be different. The gap may be adjusted by changing the diameter of the high-speed rotating portion in the direction of the rotary shaft, or alternatively, by providing the high-speed rotating portion in a form of a truncated cone and vertically moving the high-speed rotating portion with respect to an inner wall of a tapered reactor.

Further, the portions having a large gap may be provided by a screw or a spiral having continuous inclination, whereby extrusion capability may be provided to the high-speed rotating portion.

Figure 3:
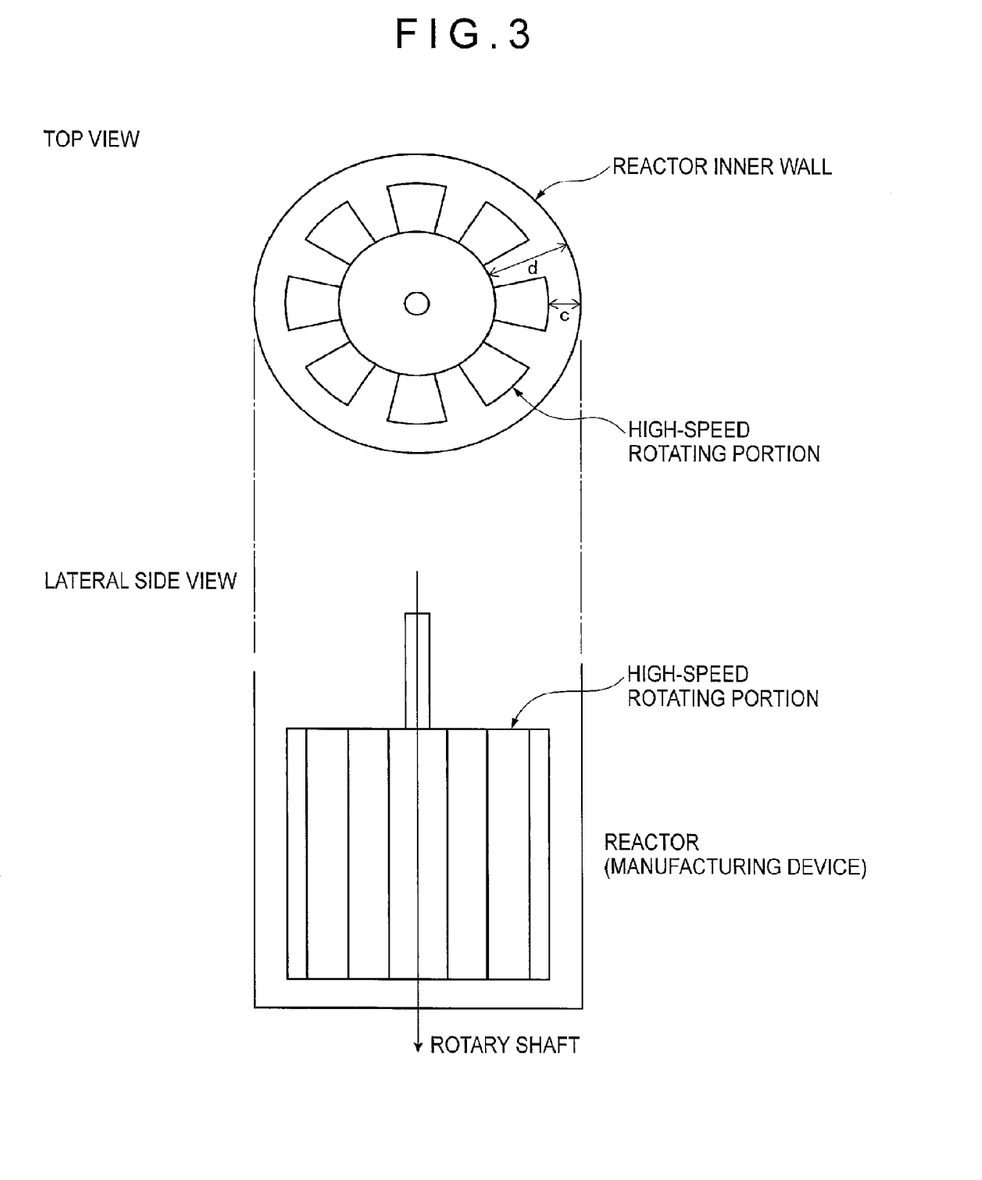
FIG. 3 schematically shows a lateral side and a top of a manufacturing device of a urea grease in another exemplary embodiment of the invention.

FIG. 3 shows a reactor (a manufacturing device of a grease) having a structure different from that of the reactor in FIG. 1, the portions having different gaps are disposed in a rotation direction. In this manufacturing device, the portions having a large gap may be inclined relative to a rotary shaft, whereby extrusion capability as provided by a screw may be provided to the high-speed rotating portion.

In the above reactor, a ratio (Max/Min) of a maximum shear rate (Max) to a minimum shear rate (Min) is preferably 100 or less, more preferably 50 or less, further preferably 10 or less. When the shear rate applied to the mixture is as uniform as possible, a grease having a uniform structure without having grown lumps is provided.

Herein, the maximum shear rate (Max) refers to a maximum shear rate applied to the mixture and the minimum shear rate (Min) refers to a minimum shear rate applied to the mixture. The maximum shear rate (Max) and the minimum shear rate (Min) are defined as follows, for instance, in the reactor shown in FIG. 1.

Max=(a linear rate of a surface of the high-speed rotating portion at the minimum gap between the surface of the high-speed rotating portion and an inner wall surface of the reactor/the gap)

Min=(a linear rate of a surface of the high-speed rotating portion at the maximum gap between the surface of the high-speed rotating portion and the inner wall surface of the reactor/the gap)

In FIG. 1, the gap used for calculating Max is a and the gap used for calculating Min is b.

Since a smaller Max/Min is preferable as described above, ideally a=b. In other words, in case of the reactor as shown in FIG. 1, the high-speed rotating portion is most preferably a cylinder vertically having a uniform diameter.

When the manufacturing device manufactures a urea grease, the manufacturing device may have a structure as shown in FIG. 2.

The present manufacturing method is applicable to all grease manufacturing methods including mixing a solution of the first base oil and the first thickener precursor with a solution of the second base oil and the second thickener precursor. Although a temperature condition for manufacturing the thickener differs depending on the precursors to be used, the temperature in a range from approximately 50 degrees C. to 200 degrees C. is preferable when manufacturing urea as the thickener. When the temperature is equal to or more than 50 degrees C., isocyanate is likely to be solved in the base oil. When the temperature is equal to or less than 200 degrees C., deterioration of the base oil can be sufficiently inhibited. A temperature of a solution of the base oil and amine before being introduced into the reactor is preferably in a range from approximately 50 degrees C. to 100 degrees C.

In the present manufacturing method, the grease obtained by the above manufacturing method may be further kneaded. For this kneading, a roll mill generally used for manufacturing a grease is usable. The above grease may be subjected to the roll mill twice or more.

In the present manufacturing method, the grease obtained by the above manufacturing method may be further heated to the temperature in a range from 80 degrees C. to 200 degrees C. Further, for uniform heating, the grease may be kneaded and stirred. A furnace and the like may be used for heating.

Additive

Various additives may be further added to the grease obtained by the present manufacturing method. Examples of the additive include an antioxidant, extreme pressure agent, rust inhibitor, and a solid lubricant.

Examples of the antioxidant include: an amine antioxidant such as alkylated diphenylamine, phenyl-α-naphthylamine and alkylated-α-naphthylamine; and a phenol antioxidant such as 2,6-di-t-butyl-4-methylphenol and 4,4-methylenebis (2,6-di-t-butylphenol). A content of the antioxidant is preferably in a range from approximately 0.05 mass % to 2 mass % based on a total amount of the grease.

Examples of the extreme pressure agent are thiocarbamates such as zinc dialkyldithiophosphate, molybdenum dialkyldithiophosphate, ashless dithiocarbamate, zinc dithiocarbamate and molybdenum dithiocarbamate, sulfur compound (sulfurized fat and oil, sulfurized olefin, polysulfide, sulfurized mineral oil, thiophosphates, thioterpenes and dialkylthiodipropionates), phosphates and phosphites (tricresyl phosphate and triphenyl phosphite). A content of the extreme pressure agent is preferably in a range from approximately 0.1 mass % to 5 mass % based on the total amount of the grease.

Examples of the rust inhibitor include benzotriazole, zinc stearate, succinate, succinic acid derivative, thiadiazole, benzotriazole, benzotriazole derivative, sodium nitrite, petroleum sulphonate, sorbitan monooleate, fatty acid soap and amine compound. A content of the rust inhibitor is preferably in a range from approximately 0.01 mass % to 10 mass % based on the total amount of the grease.

Examples of the solid lubricant include polyimide, PTFE, graphite, metal oxide, boron nitride, melamine cyanurate (MCA) and molybdenum disulfide.

One of the above various additives may be blended alone, or alternatively, a plurality of those may be blended in combination.

EXAMPLES

The invention will be described in further detail with reference to Examples and Comparatives, but the description is mere illustrative but not exhaustive of the invention. Specifically, a urea grease was manufactured under the following various conditions and properties of the obtained grease were evaluated.

Example 1

A grease was manufactured using a urea grease manufacturing device as shown in FIG. 3. A grease manufacturing method was specifically performed as follows.

A PAO base oil (manufactured by INEOS Oligomers: Durasyn170, containing cyclohexylamine of 28.1 mass %) heated at 70 degrees C. and a PAO base oil (manufactured by INEOS Oligomers: Durasyn170, containing MDI of 11.0 mass %) heated at 70 degrees C. were continuously introduced at respective flow rates of 144 mL/min and 504 mL/min into a manufacturing device. Immediately after the introduction, a maximum shear rate of 42,000 $s^{-1}$ was applied to the obtained mixture by a high-speed rotating portion when the mixture passes a gap. A ratio (Max/Min) of the maximum shear rate (Max) to the minimum shear rate (Min) when the mixture passes the gap was 1.03. A time elapsed before applying the maximum shear rate to the mixture after mixing the above two base oils was about three seconds. An amount of a thickener was 15 mass % in the manufactured grease.

A lump formation state of the obtained grease was observed with an optical microscope. The same applied to later-described greases in Examples and Comparatives.

Example 2

The grease manufactured in Example 1 was kneaded by the roll mill twice.

Example 3

A grease was manufactured in the same manner as in Example 1, except that the maximum shear rate applied to the mixture was 83,900 $s^{-1}$. The amount of the thickener was 15 mass % in the manufactured grease.

Example 4

The grease manufactured in Example 3 was kneaded by the roll mill twice.

Example 5

A grease was manufactured in the same manner as in Example 1, except that a concentration of cyclohexylamine was 23.8 mass %, a concentration of MDI was 9.0 mass %, the flow rate of the amine solution was 100 mL/min, the flow rate of the MIDI solution was 330 mL/min, and the maximum shear rate was 216,000 $s^{-1}$. The amount of the thickener was 12 mass % in the manufactured grease.

Example 6

The grease manufactured in Example 5 was kneaded by the roll mill twice.

Comparative 1

Figure 4:
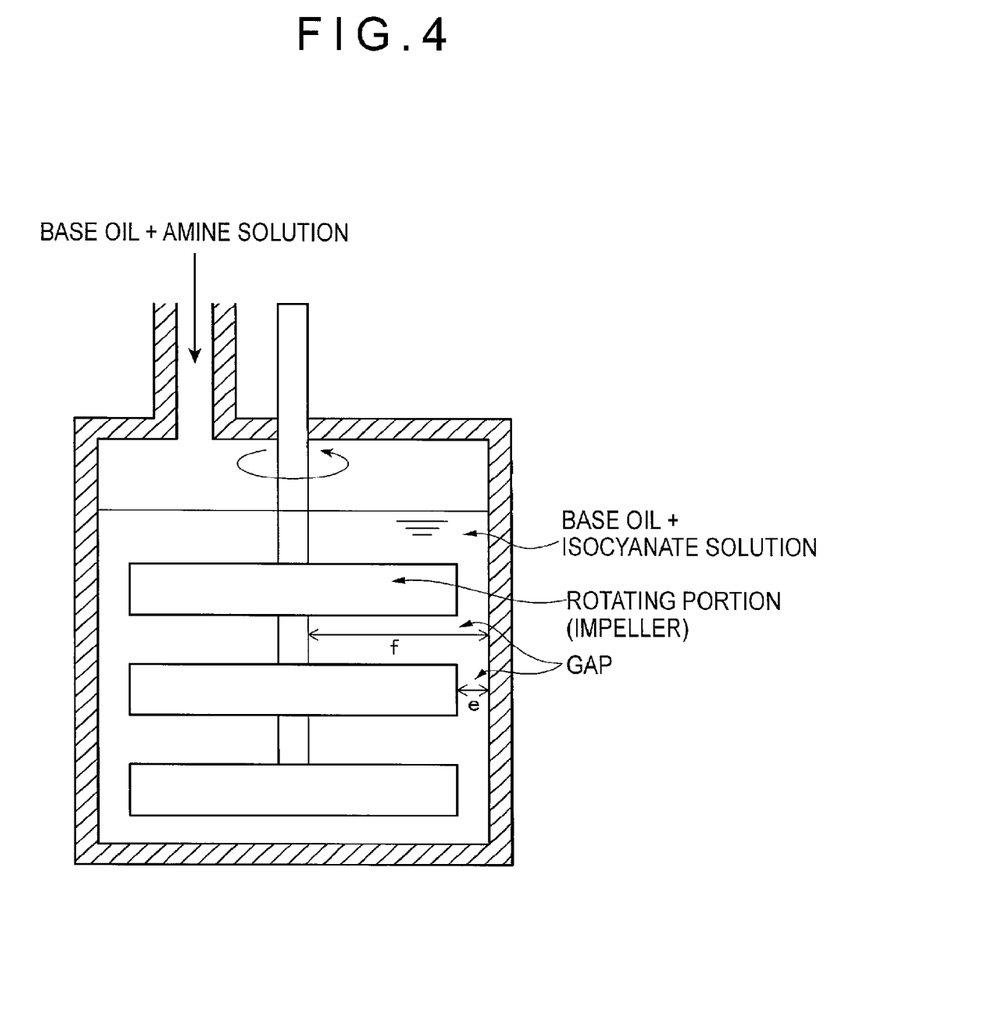
FIG. 4 schematically shows a typical manufacturing method of the urea grease.

A urea grease was manufactured by a typical method. Specifically, as shown in FIG. 4, a PAO base oil (manufactured by INEOS Oligomers: Durasyn170, containing cyclohexylamine of 15.7 mass %) kept at 60 degrees C. was dropped into a PAO base oil (manufactured by INEOS Oligomers: Durasyn170, containing MDI of 14.5 mass %) stirred by an impeller and kept at 60 degrees C. After the amine solution was dropped therein, the mixture was heated to 160 degrees C. with stirring and maintained for one hour. Subsequently, the mixture was cooled with stirring The amount of the thickener was 15 mass % in the manufactured grease.

Comparative 2

The grease manufactured in Comparative 1 was kneaded by the roll mill twice.

TABLE 1

Figure 5:
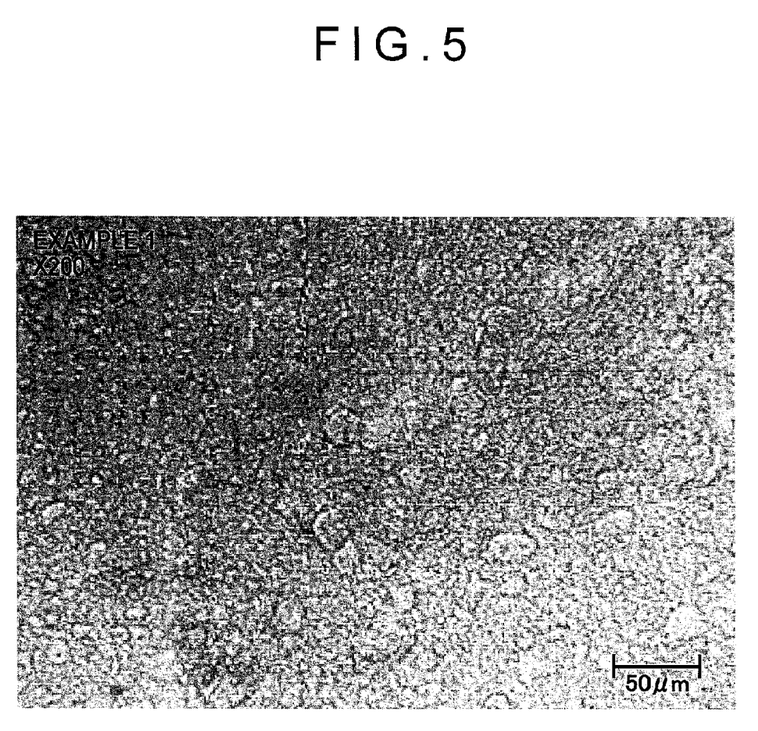
FIG. 5 is an optical micrograph of a grease manufactured in Example 1 of the invention.
Figure 6:
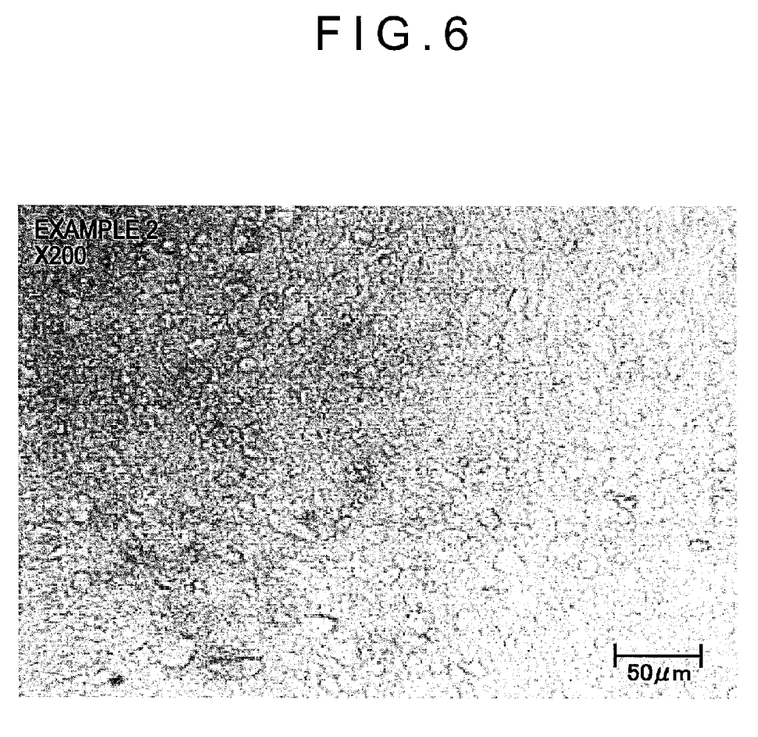
FIG. 6 is an optical micrograph of a grease manufactured in Example 2 of the invention.
Figure 7:
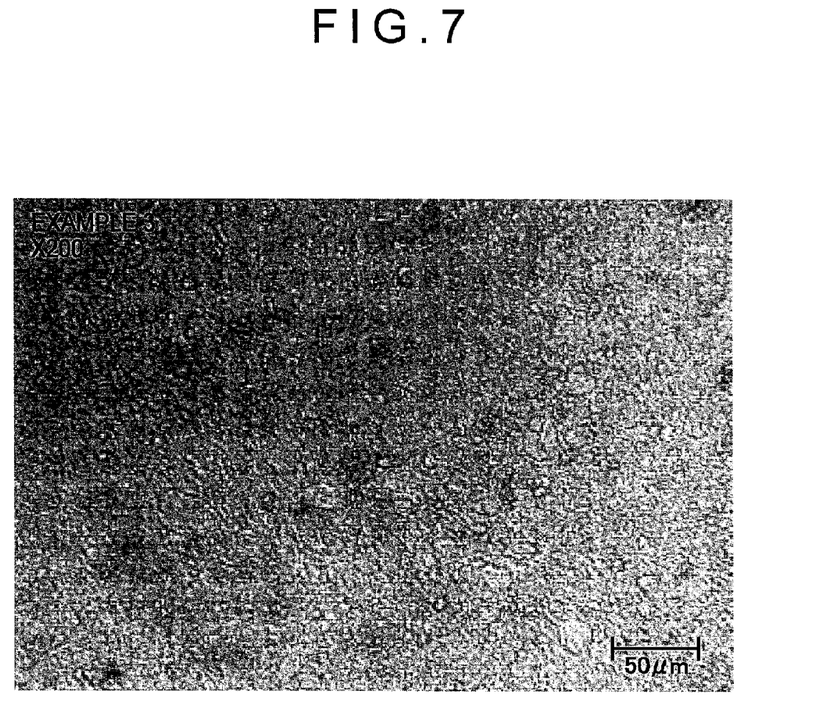
FIG. 7 is an optical micrograph of grease manufactured in Example 3 of the invention.
Figure 8:
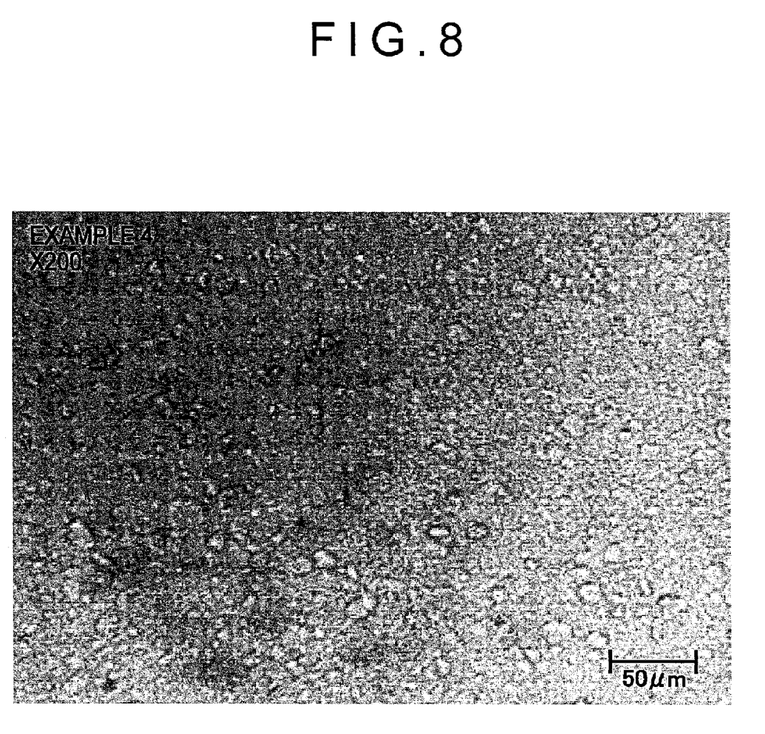
FIG. 8 is an optical micrograph of a grease manufactured in Example 4 of the invention.
Figure 9:
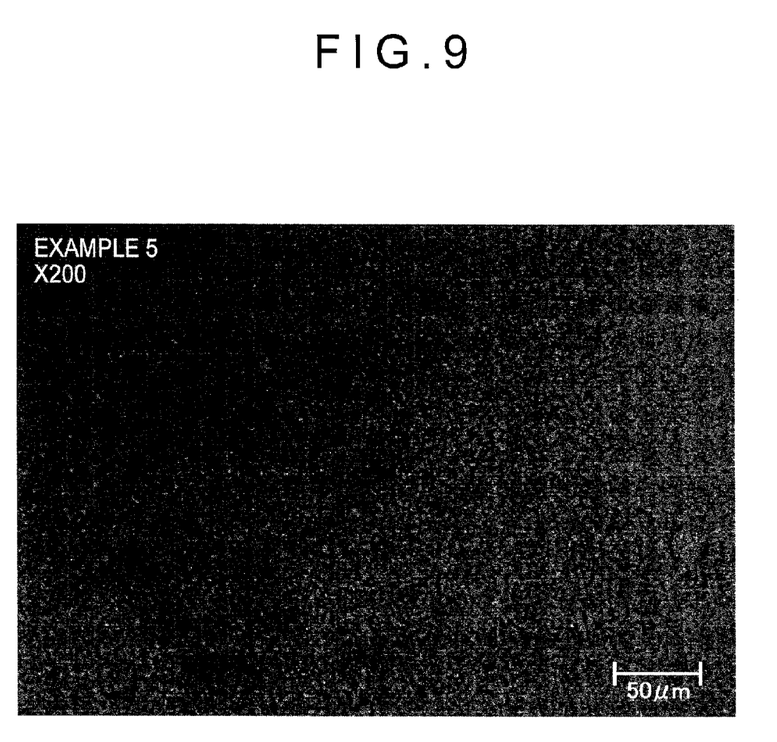
FIG. 9 is an optical micrograph of a grease manufactured in Example 5 of the invention.
Figure 10:
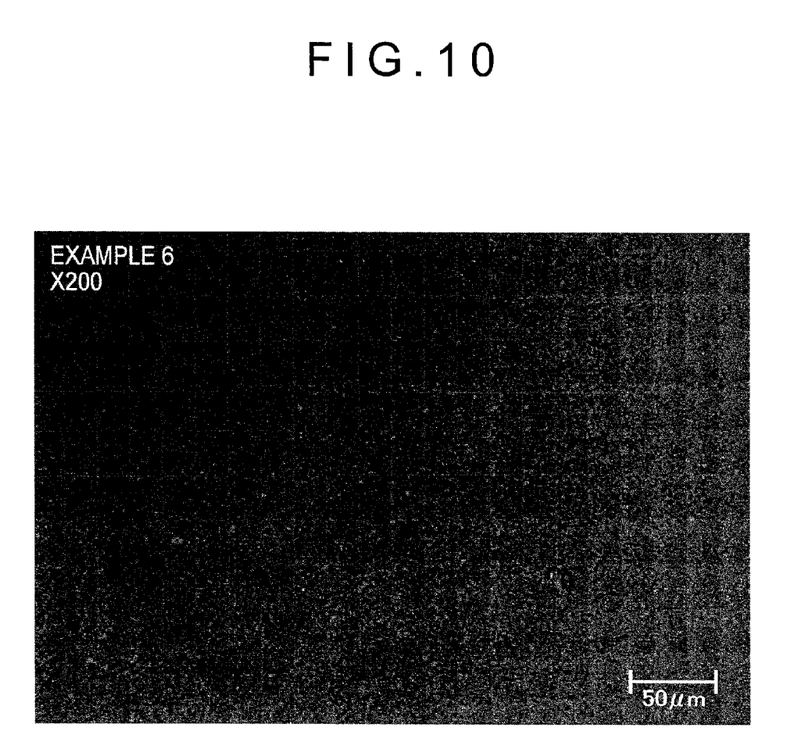
FIG. 10 is an optical micrograph of a grease manufactured in Example 6 of the invention.
Figure 11:
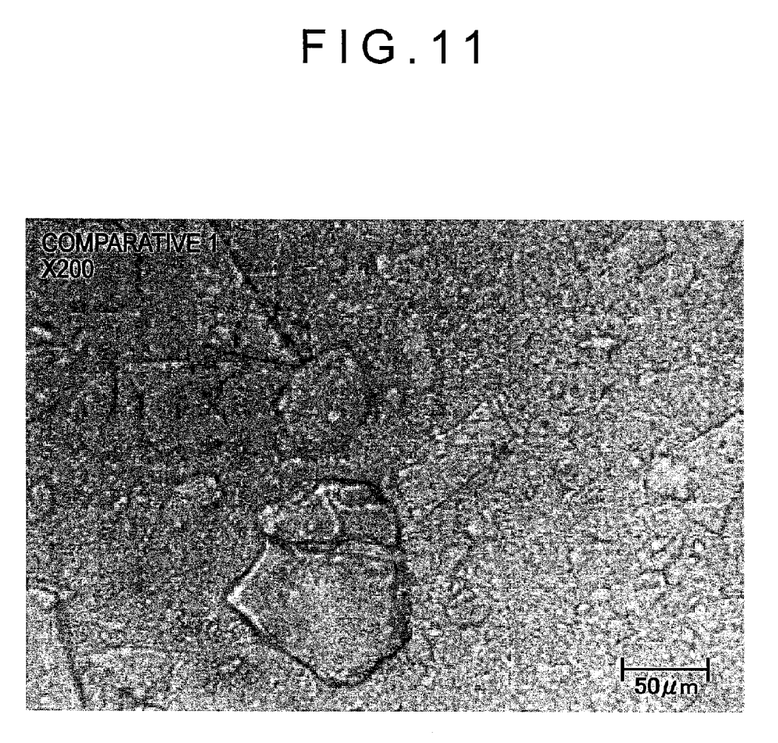
FIG. 11 is an optical micrograph of a grease manufactured in Comparative 1 of the invention.
Figure 12:
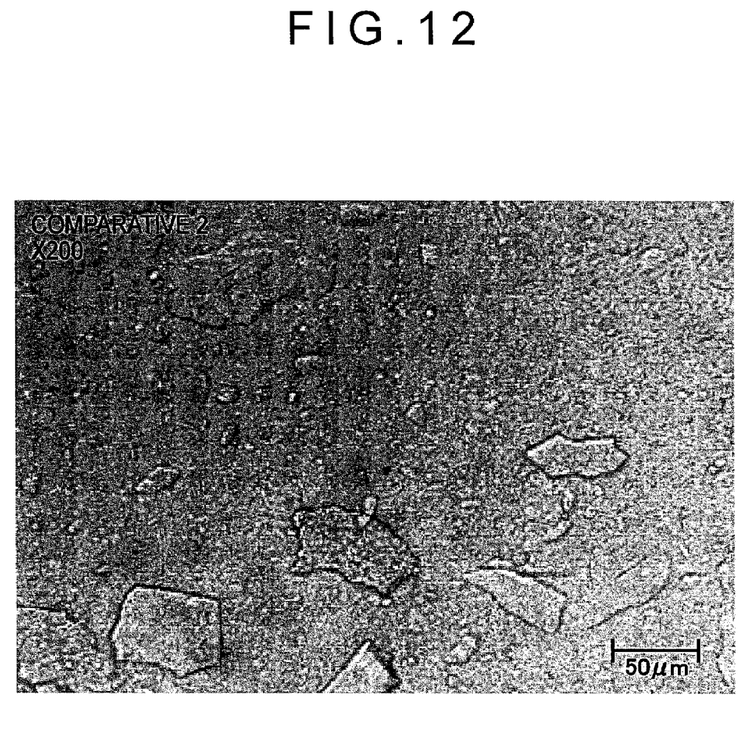
FIG. 12 is an optical micrograph of a grease manufactured in Comparative 2 of the invention.

| | Thickener Amount (mass %) | Manufacturing Time | Worked Penetration | Condition of Lumps Summary | Micrograph |
|---|---|---|---|---|---|
| Example 1 | 15 | 2 min | 277 | small | FIG. 5 |
| Example 2 | 15 | 15 min | 246 | extremely small | FIG. 6 |
| Example 3 | 15 | 2 min | 231 | extremely small | FIG. 7 |
| Example 4 | 15 | 15 min | 210 | extremely small | FIG. 8 |
| Example 5 | 12 | 2 min | 254 | extremely small to be almost nought | FIG. 9 |
| Example 6 | 12 | 15 min | 240 | extremely small to be almost nought | FIG. 10 |
| Comparative 1 | 15 | 5 hrs | 282 | extremely large | FIG. 11 |
| Comparative 2 | 15 | 5.5 hrs | 245 | large | FIG. 12 |

Evaluation Results

Table 1 shows a time for manufacturing the grease, worked penetration (in accordance with JIS K 22205.3) and condition (i.e., size) of lumps in each of Examples and Comparatives. FIGS. 5 to 12 show optical micrographs of the greases.

According to the results shown in Table 1, all of the urea greases obtained in Examples 1 to 6 by the present manufacturing method have small lumps and exhibit an excellent uniformity. Accordingly, it can be understood that the urea greases also exhibit an excellent acoustic property. Particularly, in Example 2 in which kneading by the roll mill was performed and in Examples 3 and 5 in which the shear rate was increased, the lumps were noticeably extremely small.

In contrast, the urea grease manufactured in Comparative 1 by a typical method has extremely large lumps and exhibits an extremely poor uniformity. The grease of Comparative 1 was kneaded with the roll mill in Comparative 2. The lumps generated in Comparative 2 are considerably larger than those in Examples, although being smaller than those in Comparative 1.

Further, according to the present manufacturing method, it is also noticeable that the grease can be manufactured within a time much shorter than a time required in a typical manufacturing method.

It should be noted that the manufacturing time shown in Table 1 does not include a time required for weighing the base oils, amine and isocyanate (MDT) and heating and solving the base oils, but indicates a time elapsed before finishing manufacturing the grease or finishing the treatment by the roll mill after starting mixing the solutions.

The invention claimed is:
1. A grease manufacturing method, comprising:
(I) separately introducing, into a reactor equipped with a rotating portion, an inner wall, a first inlet, and a second inlet, a first base oil comprising a first thickener precursor via the first inlet and a second base oil comprising a second thickener precursor via the second inlet, to obtain a mixture in the reactor, wherein at least a portion of the first base oil is introduced concurrently with at least a portion of the second base oil;

(II) applying a shear rate of $10^2 s^{-1}$ or more to the mixture in the reactor by relative movement of the rotating portion and the inner wall, to obtain a thickener.

2. The grease manufacturing method according to claim 1, wherein the shear rate is $10^7 s^{-1}$ or less.

3. The grease manufacturing method according to claim 1, wherein the shear rate is applied to the mixture within 15 minutes after mixing the first base oil and the second base oil.

4. The grease manufacturing method according to claim 1, wherein a ratio (Max/Min) of a maximum shear rate (Max) to a minimum shear rate (Min) in the shear rate applied to the mixture is 100 or less.

5. The grease manufacturing method according to claim 1, wherein the first thickener precursor is monoamine and the second thickener precursor is diisocyanate.

6. The grease manufacturing method according to claim 1, further comprising: kneading the grease.

7. The grease manufacturing method according to claim 1, further comprising: heating the grease to a temperature in a range from 80 degrees C. to 200 degrees C.

8. The grease manufacturing method according to claim 7, further comprising: kneading the grease.

9. The grease manufacturing method according to claim 1, wherein a shear rate of $10^4 s^{-1}$ or more is applied to the mixture.

10. The grease manufacturing method according to claim 1, wherein a shear rate of $10^3 s^{-1}$ or more is applied to the mixture.

11. The grease manufacturing method according to claim 1, wherein the shear rate is applied to the mixture for 15 minutes or less.

12. The grease manufacturing method according to claim 1, wherein the shear rate of $10^2 s^{-1}$ or more is applied to the mixture immediately as the first base oil and the second base oil are combined in the mixing apparatus.

13. The grease manufacturing method according to claim 1, wherein the shear rate of $10^2 s^{-1}$ or more is applied to the mixture within three seconds after the first base oil and the second base oil are mixed.

14. The grease manufacturing method according to claim 1, wherein the first base oil and the second base oil are separately added at the top of the reactor and pass downward to the bottom of the reactor and, after applying the shear rate of $10^2 s^{-1}$ or more to the mixture, the thickener is removed from the bottom of the reactor.

15. The grease manufacturing method according to claim 1, wherein, after applying the shear rate of $10^2 s^{-1}$ or more to the mixture, the thickener is present in the mixture in the form of lumps having a size of 50 µm or less.

16. The grease manufacturing method according to claim 1, wherein the first base oil and the second base oil are continuously added to the reactor and the mixture containing the thickener is continuously removed from the reactor.

17. The grease manufacturing method according to claim 1, wherein the first base oil and the second base oil are added at an upstream end of the reactor and the mixing conveys the mixture to a downstream end of the reactor to exit the reactor at the downstream end of the reactor.

\* \* \* \* \*